Sept. 7, 1948. E. R. MAURER 2,448,539
FLUID COUPLING WITH CENTRIFUGAL LOCKUP MEANS
Filed Feb. 19, 1945 4 Sheets-Sheet 3

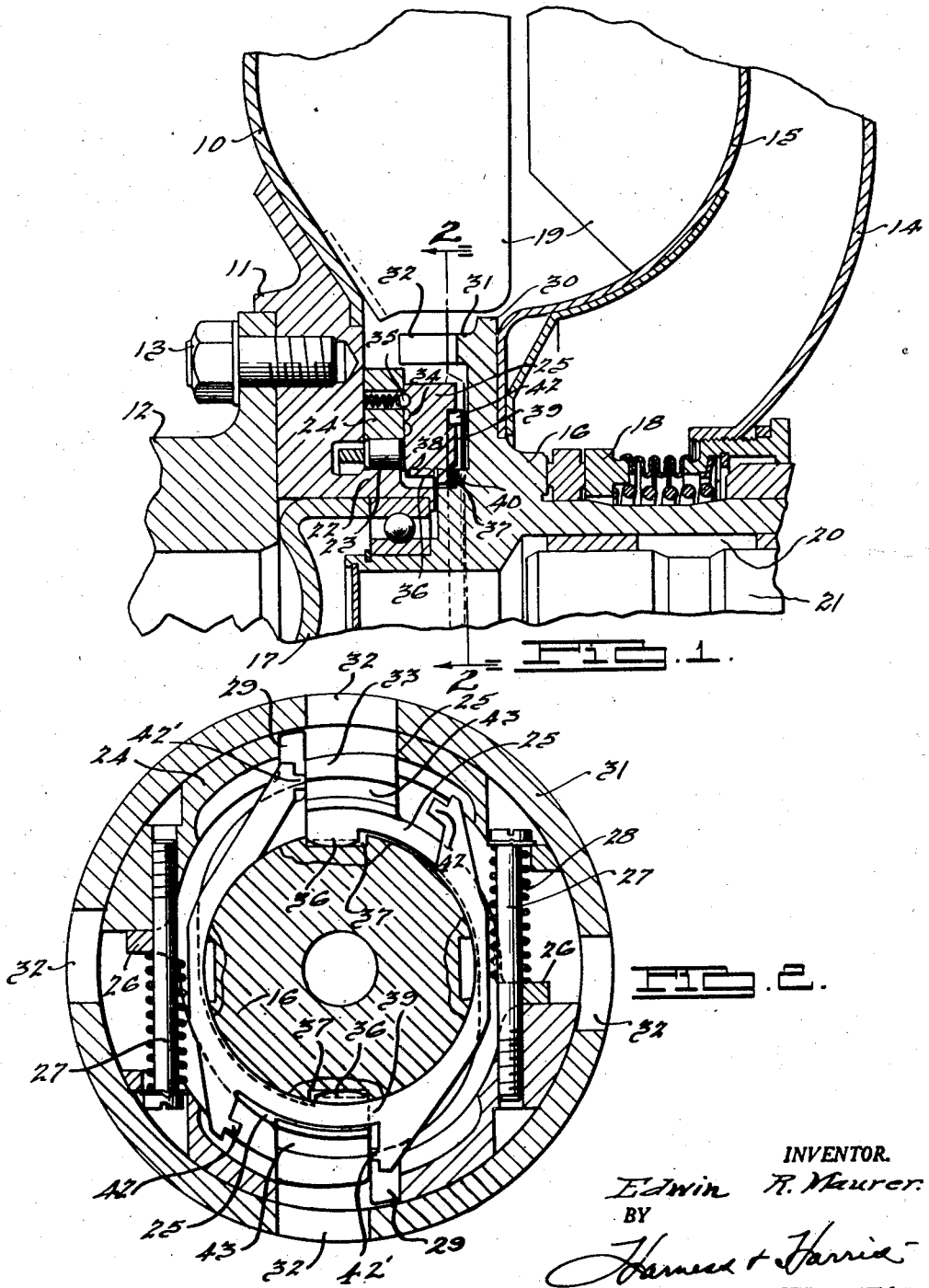

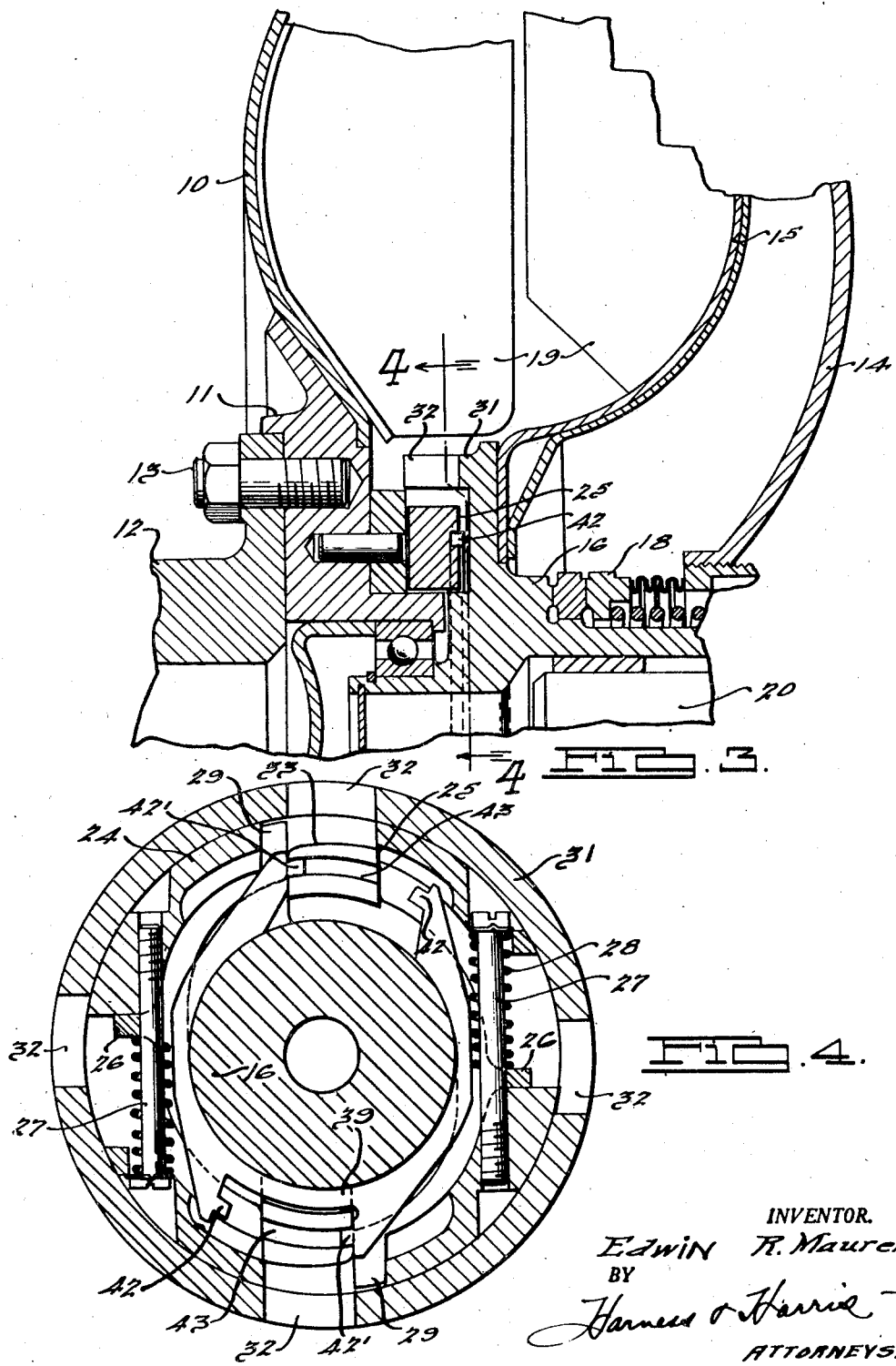

INVENTOR.
Edwin R. Maurer.
BY
Harness & Harris
ATTORNEYS.

Sept. 7, 1948.  E. R. MAURER  2,448,539
FLUID COUPLING WITH CENTRIFUGAL LOCKUP MEANS
Filed Feb. 19, 1945  4 Sheets-Sheet 4

INVENTOR.
Edwin R. Maurer
BY
Harness & Harris
ATTORNEYS.

Patented Sept. 7, 1948

2,448,539

UNITED STATES PATENT OFFICE 2,448,539

FLUID COUPLING WITH CENTRIFUGAL LOCKUP MEANS

Edwin R. Maurer, Detroit, Mich., assignor to Chrysler Corporation, Highland Park, Mich., a corporation of Delaware Application February 19, 1945, Serial No. 578,631

9 Claims. (Cl. 192—3.2)

1

This invention relates to fluid drives and more particularly to means for improving the operating efficiency, safety and characteristics of fluid drive devices for motor vehicles. The invention is an improvement over the drives disclosed and claimed in Maurer application Serial No. 792,466, filed December 18, 1947 (which is a continuation of abandoned Maurer application, Serial Number 531,867, filed April 20, 1944) and Maurer and Caton, application Serial Number 531,868, filed April 20, 1944.

In the aforesaid applications, means is disclosed which may be built in the coupling for locking the coupling elements together against slip under certain vehicle operating conditions.

While fluid coupling drives owe their popularity in large part to the slip characteristic which permits the impeller to "slip" relative to the runner, this slip wastes fuel and cuts down overall operating efficiency. The aforesaid patent applications disclose and claim means for eliminating the slip at car speeds above and below engine idling speed, when slip is not needed and is actually undesirable.

The devices therein disclosed operate satisfactorily and effect a decided improvement in the operation of a motor vehicle so equipped, but further study has shown the desirability of providing blocker means for preventing accidental operation of the lock-up device under conditions which might result in damage to the parts.

Accordingly, it is the principal object of this invention to provide a mechanism for locking the rotatable elements of a fluid coupling together under certain vehicle operating conditions which incorporates block means for positively preventing operation of the lock-up mechanism under certain other conditions.

Other objects and advantages of the invention will become apparent from the following specification which describes specific embodiments of the invention.

In the drawings which accompany the specification:

Fig. 1 is a sectional elevation of a portion of a transmission embodying the present invention;

Fig. 2 is a sectional view along the line 2—2 of Fig. 1;

Fig. 3 and 4 are similar views of a modified form of the invention;

Figures 5, 6:
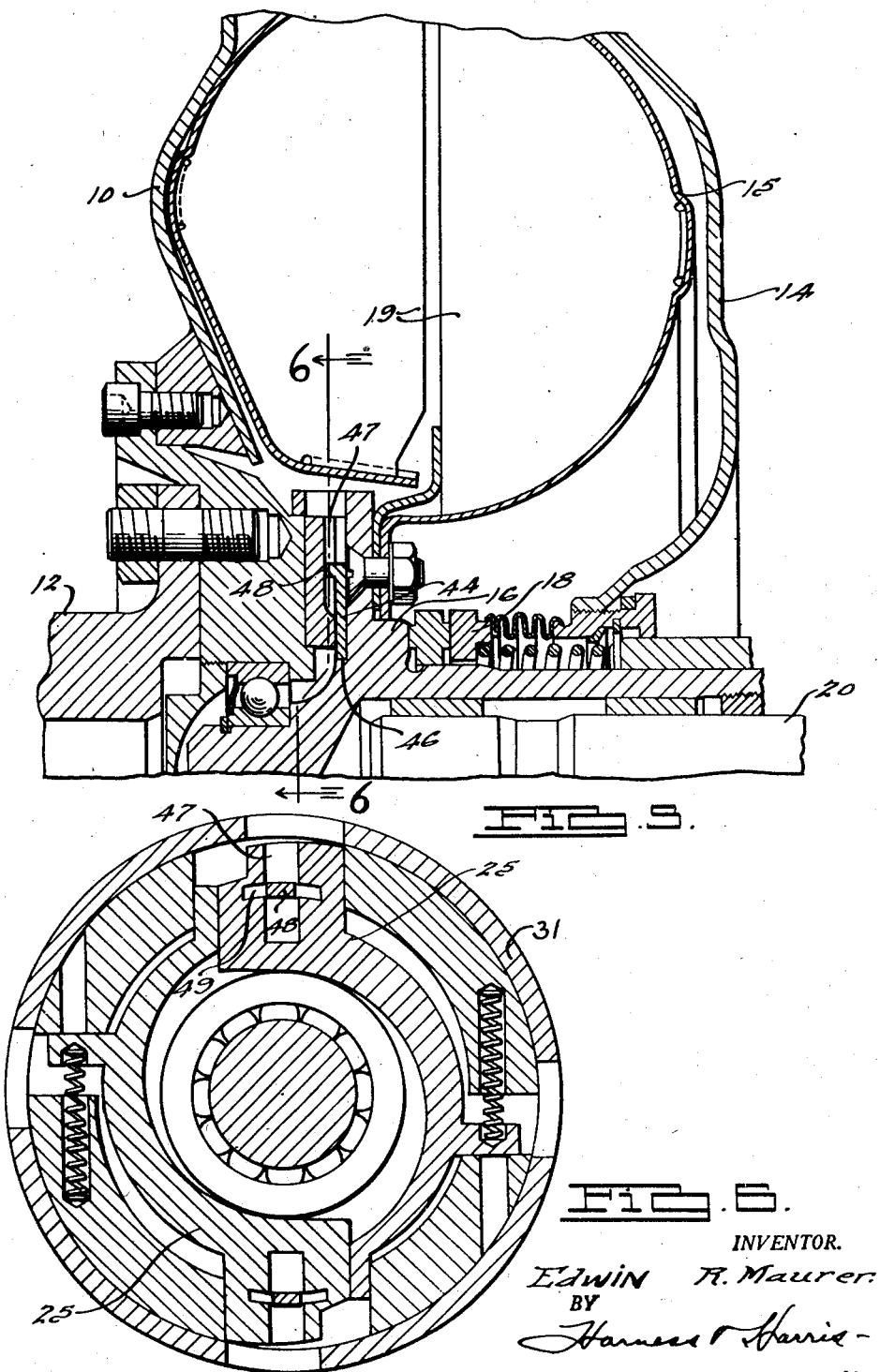
Fig. 5 and 6 are similar views of a second modification.

Referring to Figs. 1 and 2, it will be seen that there is illustrated a fluid coupling impeller 10 carried by a hub 11 which is fastened to an engine crankshaft 12 by means of studs 13. The impeller includes a housing portion 14 which incloses a runner 15, the latter being welded or otherwise fastened to a hub 16. A forward seal 17 and a rear seal 18 prevent leakage of the fluid which is circulated in the passages formed by the vanes 19, as is common in the art. The runner hub 16 has a tubular portion as at 20 for piloting a drive shaft 21.

The impeller hub 11 has an inwardly projecting annular portion 22 on which is formed a series of cams. These cams form one element of a roller clutch having rollers 23. The other element of the clutch is formed by a pawl drive plate 24 which has an inner cylindrical surface in engagement with the rollers 23 and carries a pair of centrifugally actuated pawls 25. The pawls are an element of the centrifugal clutch and have ears 26 for loosely engaging bolts 27. The bolts 27 are rigidly carried in the pawl drive plate 24 as shown and mount a coil compression spring 28 which tends to keep the pawls 25 in retracted position. The pawls are shaped as illustrated and each has an integral tail portion 29 which lies alongside the engaging portion of the other pawl and acts as a dragging connection between the pawl and the plate 24 as well as a guide to keep the pawls in position. The pawls loosely embrace the hub 16 and have sufficient clearance with respect thereto such that they can move radially outwardly under the influence of centrifugal force. This movement is limited in both directions by engagement of the inner surface of the pawls with the hub portion 16 as will be understood.

The springs 28 may be of any desired strength to produce the operating characteristics desired, it being understood that the springs will keep the pawls in the illustrated retracted position until a predetermined speed of the shaft 21 is reached, whereupon the centrifugal force will overcome the force of the springs and the pawls will tend to move radially outwardly as will be explained below.

The runner hub 16 has a slight baffle 30 for reducing the efficiency of the coupling at idling speed and for preventing surges and is also formed with a forwardly projecting annular portion 31 provided with circumferentially spaced notches 32. Four notches are shown but more may be required in some installations just as more than two pawls may be required for smooth operation.

The notches 32 are shown radially aligned with the pawls 25 such that the pawls may engage the notches to lock the drive plate 24 to the runner hub 16. The pawls 25 are formed with an outer cammed surface 33 which is shaped such that when the pawls are urged outwardly by centrifugal force and the member 31 is rotated at a different speed than the plate 24, the surface 33 will engage the edge of the notches 32 and cam the pawls inwardly until the speeds of the two members are substantially equal whereupon the pawls will enter the notches.

Each of the pawls is provided with three detent holes 34 which are adapted to receive a spring urged ball detent 35 carried by the drive plate 24. The detents prevent hunting of the pawls and tend to hold the pawls in one of three positions while the plate 25 is rotating within the respective desired speed ranges.

Each pawl is provided with an inner tooth 36 which is adapted to engage openings 37 formed in the hub 16 and similar openings 38 in the portion 22 of impeller hub 11. The inner teeth 36 are preferably of stepped construction so that upon inward radial movement thereof the openings 37 in the runner hub will be engaged prior to the openings 38 in the annular portion 22 of the impeller hub 11. Otherwise, there might be instances when the teeth 36 would not engage both the runner and impeller hubs as soon as desired because the runner and engine might not come to rest at the same time and with slots 37 and 38 aligned axially. The stepped teeth 36 facilitate the clutching action but the teeth may be made without the step if desired. The teeth 36 are cammed so that they will smoothly engage the respective openings 37 and 38 when the pawls are rotating in synchronism with the hub 16 and the impeller 11 or both as the case may be. Should the pawls be urged outwardly by centrifugal force or inwardly by the springs 28 at times when the parts to be engaged are not rotating synchronously, the cammed outer ends of the pawls will engage the edges of the respective openings and the pawls will be prevented from engaging the openings until the pawls reach synchronism.

The operation of the device so far described is as follows:

Let it be assumed that the parts are in the positioned illustrated with the vehicle engine, the hub 16 and the shaft 21 at rest. The engine may be started by pushing or towing the car and the engine compression may be used for braking on grades by coasting with a dead engine under these conditions because the impeller and runner are directly connected through the pawl teeth 36.

When the engine is started the pawls 25 will disengage themselves from the hub portions 16 and 22 at approximately 325 R. P. M. The retracting springs 28 and the detent springs are preferably chosen such that centrifugal force on the pawls will affect their outward movement to mid-position at an engine speed of between 250 and 400 R. P. M., the engine idling speed with a warm engine being about 425 R. P. M. It is assumed that a vehicle clutch (not shown) or other equivalent disengaging means located between the runner 15 and the drive wheels will be disengaged, when the engine is started or the transmission is in neutral.

In such case, the frictional load on the pawl teeth 36 will not be great and the pawls will disengage without difficulty.

When the pawls have moved to mid-position the detent ball 35 engages the center hole 34 and the impeller 10 and runner 15 are free for normal operation. The vehicle may then be started, accelerated, maneuvered, etc., with the coupling elements slipping.

When the vehicle has been accelerated to the predetermined cruising speed, for example, about 25 M. P. H., the pawls 25 under the influence of centrifugal force, tend to move outwardly to engage the openings 32. They will be prevented from engaging the openings, however, so long as the speeds of the pawls and the hub 16 are different as they normally will be because of the slip. The driver can effect engagement of the pawls by momentarily releasing the throttle whereupon the impeller will drop in speed relative to the runner and the pawls will engage at the instant of synchronism.

From the description it will be apparent that the pawls, acting through the influence of centrifugal force when the engine is accelerated, will overcome the ball detent 35 and become disengaged from the openings 37 and 38. As the speed of the engine is increased the pawls continue their outward movement for engagemnt with the notches 32.

As a means to positively block the movement of the pawls from mid-position under non-synchronous conditions, there is provided a balking ring 39 carried by an annular flange 40 on the hub 16. This balking ring is provided with projections 42 and 42' which are adapted to be received in the opposite ends respectively of openings 43 in the pawls 25 when the pawls are moved radially outwardly a distance to cause disengagement of the inner teeth 36 from the openings 37 and 38. This disengagement of the teeth 36 permits relative rotation between the impeller 10 and the runner 15, known as "slippage," thereby causing the diametrically opposite projections 42' to engage the openings 43 and block further outward movement of the pawls.

When the driver has reached a satisfactory car speed, he releases the throttle control momentarily which causes a drop in speed of the impeller 10 and drive plate 24 relative to the runner hub 16 which carries the integral annular portion 31. When the speed of the impeller and its associated parts drops to the speed of the runner hub 16, the frictional contact between the latter and the balk ring 39 will effect slight rotation of the ring in the direction of rotation thereby withdrawing the projections 42' from the openings 43 permitting the pawls to move outwardly by the action of centrifugal force into engagement with the notches 32, the speeds of the impeller and runner being in synchronism at this instant as above described.

The impeller and runner are now locked for conjoint operation without slippage so long as the impeller tends to overrun the runner as is the case during normal driving of the car by the engine. When the car tends to drive the engine above the aforesaid pawl cut-in speed, the runner 15 will overrun the impeller 10 and there will be slippage therebetween due to the roller clutch 23 which acts as a one way driving connection between the impeller and the pawl drive plate.

When the vehicle speed is reduced, the pawls 25 will drop out of the openings 32 at some speed below 25 M. P. H., depending upon the strength of the detent springs and the frictional load on the pawls which will be less when the vehicle is coasting than when the engine is driving due to the clutch 23. The runner 15 and ring 39 are now rotating at a greater speed than the impeller 10 thereby causing the projections 42 to engage the openings 43 as the pawls are moved inwardly. This engagement holds the pawls against further inward movement preventing the teeth 36 from entering the openings 37 and 38 thus preventing a positive lock between the impeller and the runner. This condition continues so long as the runner overruns the impeller. When the vehicle has stopped and the engine is idling the balking ring continues to rotate in a counterclockwise direction (as viewed in Fig. 2) under drive by the pawls 25, the frictional drag of the hub portion 16, disengaging the projections 42 from the openings 43 and engaging the projections 42' therein. When the engine has stopped the projections 42' may remain in the openings 43 and the pawls 25 remain locked against inward movement for engagement of the teeth 36 with the slots 37, but as soon as there is any relative movement between hubs 11 and 16 as would be the case in towing or pushing the vehicle with the engine stopped, the balk ring would by its frictional engagement with hub 16 be moved counter-clockwise thereby disengaging the projections 42' from the openings 43 to permit the pawls to move inwardly locking the teeth 36 in the openings 37 and 38. The impeller 10 and runner 15 are then directly locked so that the engine may be started by towing or pushing the vehicle.

The form of the device illustrated in Figs. 3 and 4 embodies the same construction as illustrated in Figs. 1 and 2 except that the overrunning rollers 23, lock up teeth 36 and spring pressed ball 35 have been omitted. The operation of the pawls 25 and balk ring 39 are the same but there is no free-wheeling when the pawls 25 are in the openings 32 as would be in the forms shown in Figs. 1 and 2.

In the form of the invention illustrated in Figs. 5 and 6 there is shown a flat ring 44 carried on an annular flange 46 of the hub 16. This flange lies between the hub 16 and the pawls 25. The pawl 25 is provided with radially extending slots 47 which receive a projection 48 on the ring 44. Between the opposite ends of the slot 47 there is provided an intersecting circumferential slot 49 adapted to receive the projection 48. The pawls 25 are free for radial movement by the action of centrifugal force, when the projection 48 is in a position shown on the drawing. As explained in connection with the form of the invention shown in Figs. 1 and 2 relative angular movement between the impeller and the runner causes circumferential movement of the projection 48 in the slot 49 relative to the pawl 25 thereby locking the pawl against radial movement.

Figure 7:
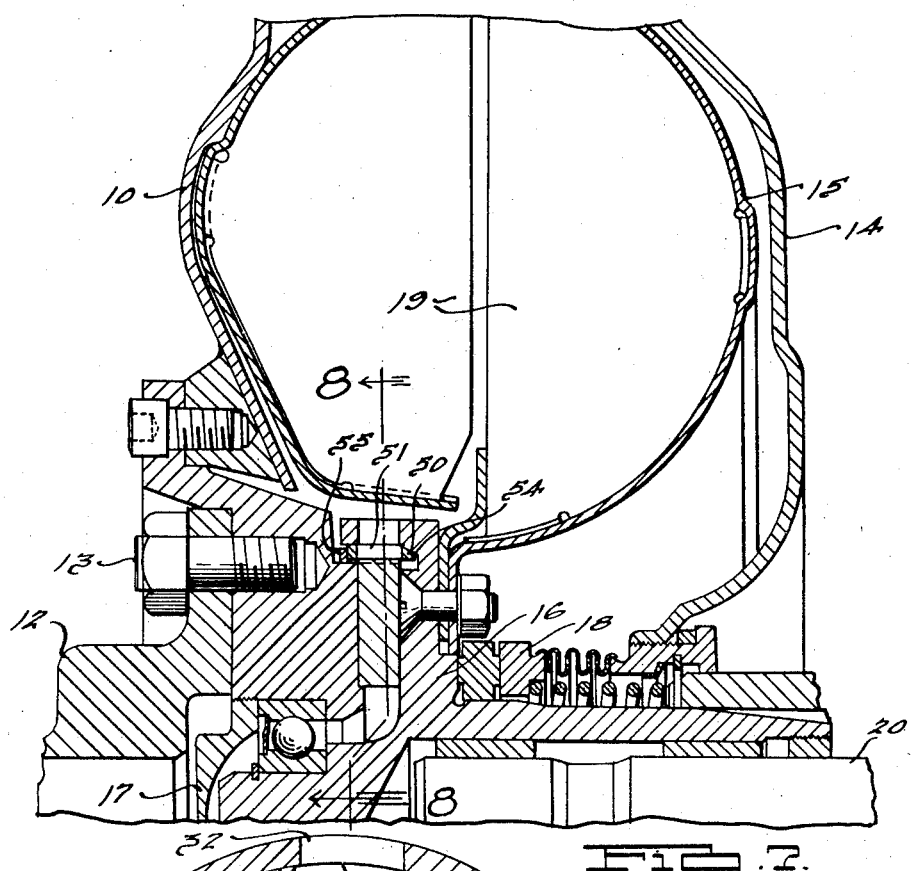
Fig. 7 and 8 are similar views of a third modification.
Figure 8:
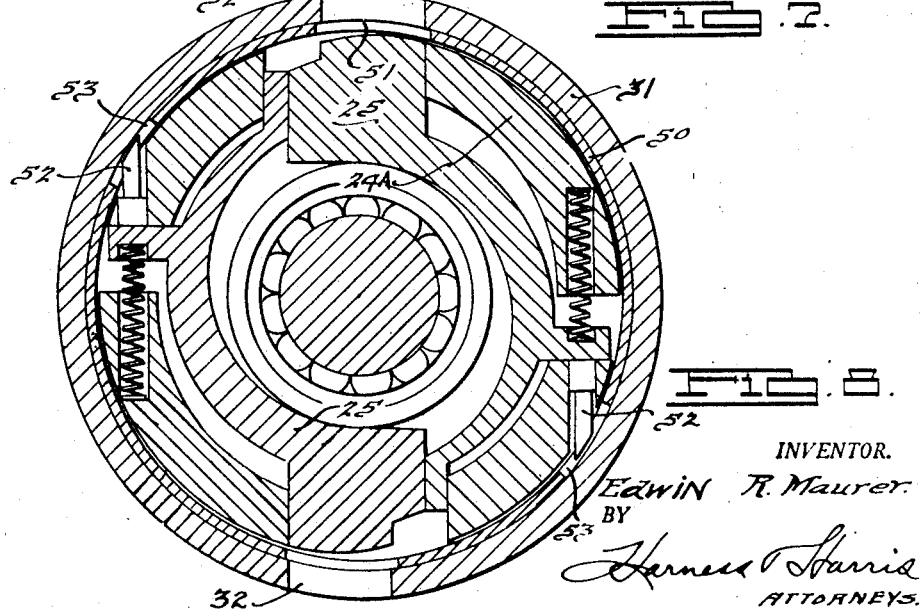

Referring to Figs. 7 and 8 there is illustrated another modified form of the balking ring. The ring is in the form of a circumferential band 50 having circumferentially spaced openings 51 extending therethrough, which as shown are of greater circumferential extent than the clutching ends of the pawls 25. The band is carried in frictional engagement with the inner periphery of the annular portion 31 of the runner hub 16. Projections in the form of pins 52 are carried by the pawl cage 24A of the impeller hub 11 and are received in openings or clocking slots 53 in the ring 50. These slots 53 are of sufficient circumferential length to permit limited relative movement between the pins 52 and the ring 50 to the extent permitted by the slots 53 from the neutral position illustrated in Fig. 8. It will be evident that when the pins 52 are at either end of the slots 53 the pawl-receiving openings 51 of the ring 50 are misaligned radially speaking, relative to the pawls 25 and hence block movement of the pawls past the ring 50. Thus, for example, as the band 50 is moved in a clockwise or counterclockwise direction by frictional drag of the annular portion 31 of the runner member 16, the pins limit the relative movement of the band 50 and the pawl-carrying cage 24A. Thereafter the annular portion 31 slips relative to the ring 50. Similarly, if the pawl-carrying cage 24A is moved in either direction relative to the runner 16 and the annular portion 31, the pins 52 will move to either end of the slots 53 of the band 50 and thereafter the band will continue to move with the pawl-carrying cage. In either case misalignment of the openings 51 of the ring 50 with the pawls 25 results, preventing the latter from entering the openings 32 of the annular portion 31 of the runner member 16. Under drive conditions after the vehicle has been accelerated to a predetermined speed and the accelerator is momentarily released, the runner following synchronism between the impeller and runner overrun the impeller, and the frictional drag between the ring 50 and the annular portion 31 will effect relative movement between the ring 50 and the pins 52 to permit the openings 51 of the band to become aligned with the pawls 25 such that the latter may pass through the openings 51. This outward movement of the pawls is facilitated by the adequate length of the slots 51 and the entry of the high portion of the pawls into the slots. Thereafter as soon as the slot 32 is aligned with the pawls 25 the latter will be projected into engagement with the openings 32 by the action of centrifugal force, thereby establishing a positive lockup between the impeller and runner.

Under coast conditions of vehicle operation as when the runner is rotating forwardly at a greater speed than the impeller the ring 50 will be driven by the frictional engagement with the hub member until the lost motion between the slots 53 and pins 52 is taken up whereupon further forward rotation of the ring 50 with the runner will stop. If the accelerator is thereupon depressed to speed up the impeller to effect synchronism with the runner, the pins 52 will first move away from the ends of the slots 50 and the pawls 25 will attempt to engage with the openings 51 as the pawl-carrying member and runner pass through synchronism. As soon as this occurs the pawls will then be further projected by centrifugal force into engagement with the slots 32 of the runner portion 31 thereby forming a positive lock-up between the impeller and runner. Should for some reason the pawls 25 not pass through the openings 51, the pins 52 will move to the other ends of the slots 53 again blocking the pawls from engagement which may thereafter be engaged upon momentary release of the accelerator in the manner described above.

The ring 50 is provided with a tapered surface 54 which is in frictional engagement with a correspondingly tapered surface on the hub 16. A spring member 55 has been provided to urge the ring with its tapered surface into engagement with the tapered surface 54 to provide a frictional drive between the ring 50 and the hub 16.

From the above, it will be understood that there has been provided a means for retaining the pawls in a pre-determined position until certain vehicle operating conditions have been reached.

It will be understood that various changes including the size, shape and arrangement of parts may be made without departing from the spirit of my invention and it is not my intention to limit its scope other than by the terms of the appended claims.

I claim:

1. In combination with a fluid coupling having a driving element, a driven element and a fluid operable therebetween as a driving means, lock-up means for locking said elements against relative rotation, and blocker means for holding said lock-up means out of locking position when said driving element overruns said driven element and for releasing said lock-up means to permit locking said elements at predetermined speeds when said driven element overruns said driving element.

2. In combination, a fluid drive mechanism including opposed rotatable fluid connected members, a lock-up device for locking said members together when said members attain a predetermined speed, a second lock-up device for locking said members together when said members attain a second predetermined speed, and blocker means for holding said lock-up devices from locking engagement with said members.

3. In combination, a fluid drive mechanism including opposed rotatable fluid connected members, a lock-up device for locking said members together when said members attain a predetermined speed, a second lock-up device for locking said members together when said members attain a second predetermined speed, and positive lock means for holding said lock-up devices from locking engagement with said members.

4. In combination, a fluid drive mechanism including opposed rotatable fluid connected members, a lock-up device for locking said members together when said members attain a predetermined speed, a second lock-up device for locking said members together when said members attain a second predetermined speed, and positive lock means for holding said lock-up device from locking engagement with said members, said positive lock means being released to permit engagement of one of said lock-up devices when said driven element overruns said driving element and to permit engagement of the other of said lock-up devices when said driving element overruns said driven element.

5. In a fluid drive mechanism having a driving member, a driven member and a fluid operable therebetween as a driving means, a pawl drive plate adapted to be driven by one of the members, centrifugally actuated pawls carried by said plate, means carried by the other of said members adapted to be engaged by said pawls at relative high speeds of said plate, and lock means for holding said pawls against the action of centrifugal force until said driven member overruns said driving member.

6. In a fluid drive mechanism having a driving member, a driven member and a fluid operable therebetween as a driving means, a pawl drive plate adapted to be driven by one of the members, centrifugally actuated pawls carried by said plate, means carried by the other of said members adapted to be engaged by said pawls at relatively low and relatively higher speeds of said plate, and positive lock means for preventing engagement of said pawls when said driven member overruns said driving member at the higher speed.

7. In combination with a fluid coupling having a driving element, a driven element and a fluid operable therebetween as a driving means, lock-up means carried by said driving element operable in response to centrifugal force for locking said elements against relative rotation, a balking member carried by said driven element frictionally driven thereby but having relative movement therewith, and means on said member for engagement with said lock-up means to hold the same against the action of centrifugal force only when said driving element overruns said driven element.

8. In combination with a fluid coupling having a driving element, a driven element and a fluid operable therebetween as a driving means, a pawl drive plate adapted to be driven by one of said elements, centrifugally actuated pawls carried by said plate, means carried by the other of said elements adapted to be engaged by said pawls at relatively high speeds of said plate, a balking ring carried by the other of said elements and having relative movement therewith, and means on said ring for locking said pawls at a predetermined speed of rotation when said pawls are moved toward locking position by the action of centrifugal force and unlocking said pawls at a higher speed of rotation when said driven element overruns said driving element.

9. In a fluid drive mechanism having driving and driven members and a fluid operable therebetween as a driving means, a pawl drive plate adapted to be driven by one of said members, centrifugally actuated pawls carried by said plate, inner and outer teeth on said pawls, means on the other of said members for engaging said inner teeth at low rotational speeds thereof and means on the other of said members for engaging said other teeth at high rotational speed thereof, and a lock member for engaging said pawls to hold them against the action of centrifugal force when said inner teeth are disengaged and to release said pawls when the driven member overruns the driving member.

EDWIN R. MAURER.

REFERENCES CITED

The following references are of record in the file of this patent:

UNITED STATES PATENTS

| Number | Name | Date |
|---|---|---|
| 2,127,637 | Barnes | Aug. 23, 1938 |
| 2,267,334 | Keller | Dec. 23, 1941 |
| 2,271,919 | Jandasek | Feb. 3, 1942 |
| 2,333,680 | Schneider et al. | Nov. 9, 1943 |
| 2,360,124 | Greenlee | Oct. 10, 1944 |
| 2,360,710 | Nutt et al. | Oct. 17, 1944 |

Certificate of Correction

Patent No. 2,448,539.                                                                 September 7, 1948.

EDWIN R. MAURER

It is hereby certified that errors appear in the printed specification of the above numbered patent requiring correction as follows:

Column 1, line 36, for the word "block" read *blocker*; column 7, line 41, claim 4, for "device" read *devices*;

and that the said Letters Patent should be read with these corrections therein that the same may conform to the record of the case in the Patent Office.

Signed and sealed this 22nd day of March, A. D. 1949.

[SEAL]

THOMAS F. MURPHY,
*Assistant Commissioner of Patents.*